(12) United States Patent
Nakayama et al.

(10) Patent No.: US 8,502,404 B2
(45) Date of Patent: Aug. 6, 2013

(54) WIND POWER GENERATING SYSTEM AND CONTROL METHOD FOR THE SAME

(75) Inventors: Yasuaki Nakayama, Hitachi (JP); Masaya Ichinose, Hitachiota (JP); Mitsugu Matsutake, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 385 days.

(21) Appl. No.: 12/859,804

(22) Filed: Aug. 20, 2010

(65) Prior Publication Data

US 2011/0074365 A1 Mar. 31, 2011

(30) Foreign Application Priority Data

Sep. 30, 2009 (JP) .................................. 2009-225901

(51) Int. Cl.
*H03D 9/00* (2006.01)
(52) U.S. Cl.
USPC .......................................................... 290/44

(58) Field of Classification Search
USPC .......................................... 290/43–44, 54–55
See application file for complete search history.

(56) References Cited

U.S. PATENT DOCUMENTS

| 6,566,764 | B2 * | 5/2003 | Rebsdorf et al. ................. 290/44 |
| 6,856,038 | B2 * | 2/2005 | Rebsdorf et al. ................. 290/44 |
| 2002/0079706 | A1 * | 6/2002 | Rebsdorf et al. ................. 290/55 |
| 2004/0026929 | A1 * | 2/2004 | Rebsdorf et al. ................. 290/44 |

FOREIGN PATENT DOCUMENTS

| JP | 04-096655 | 3/1992 |
| JP | 2004-120820 | 4/2004 |
| JP | 2008-079383 | 4/2008 |
| JP | 2009-189189 | 8/2009 |

* cited by examiner

*Primary Examiner* — Jean F Duverne
(74) *Attorney, Agent, or Firm* — Antonelli, Terry, Stout & Kraus, LLP.

(57) ABSTRACT

A wind power generating system includes a unit for eliminating harmonics component of specified-order from inputted current detection value of a grid-side converter and a unit for controlling the grid-side converter using the current detection value in which harmonics are eliminated.

11 Claims, 5 Drawing Sheets

WIND POWER GENERATING SYSTEM AND CONTROL METHOD FOR THE SAME

BACKGROUND OF THE INVENTION

The present invention relates to a wind power generating system which supplies electric power to an electric power system.

In an AC excitation type generator or doubly-fed induction generator used in a power plant, a rotor winding is AC-excited at a slip frequency (difference between a system frequency and a rotation frequency) by means of a converter, so that voltage generated on the side of stator can be made to be equal to the system frequency by excitation of the rotor. There are merits that the excitation frequency (slip frequency) of the rotor can be changed to thereby vary the rotational number of a windmill and the capacity of a power converter can be made smaller as compared with the capacity of the generator.

However, low-order harmonics components (for example, 5th- and 7th-order) are contained in stator voltage depending on the slot structure of the stator and the rotor of the doubly-fed induction generator. Current of the converter on the grid-side is distorted due to the low-order harmonics components of the stator voltage. At this time, when a current control response is not raised sufficiently, it is apprehended that control of the converter spreads or increases the current distortion.

JP-A-2008-79383 discloses that a filter is inserted for control of current of a converter on the generator-side, although the filter is used to correct output of the current control system and there is no effect of eliminating the current distortion entering the current control system.

SUMMARY OF THE INVENTION

It is an object of the present invention to prevent current distortion of a grid-side converter caused by distortion of stator voltage of the doubly-fed induction generator from being spread or increasing.

In order to achieve the above object, according to the present invention, a wind power generation system includes a doubly-fed induction generator having a stator connected to a grid, a rotor-side converter connected to a rotor of the doubly-fed induction generator, a turbine connected to the rotor of the doubly-fed induction generator, a grid-side converter connected to the stator of the doubly-fed induction generator and the grid, a controller to connect DC portion of the grid-side converter to DC portion of the rotor-side converter to control the rotor-side converter and the grid-side converter, current detection means to detect AC input current of the grid-side converter and means to input the detected current value to the controller. The controller performs current control using the inputted current detection value and comprises means to eliminate harmonics component of specified order from the inputted current detection value of the grid-side converter and means to control the grid-side converter using the current detection value in which harmonics are eliminated.

Furthermore, according to the present invention, the wind power generation system comprises means to convert the inputted current detection value of the grid-side converter into DC component by rotating coordinate transformation, means to supply the converted DC component of the inputted current detection value of the grid-side converter to a filter in the controller to eliminate specified-order harmonics contained in output current detection value of the grid-side converter, and control means to control the grid-side converter using the current detection value in which specified-order harmonics are eliminated.

Moreover, according to the present invention, the wind power generation system comprises means to supply output current detection value of the grid-side converter to a filter to eliminate specified-order harmonics contained in output current detection value of the grid-side converter and control means to control the grid-side converter using the current detection value in which specified harmonics are eliminated.

Further, in order to achieve the above object, according to the present invention, a wind power generation system includes a doubly-fed induction generator having a stator connected to a grid, a rotor-side converter connected to a rotor of the doubly-fed induction generator, a turbine connected to the rotor of the doubly-fed induction generator, a grid-side converter connected to the stator of the doubly-fed induction generator and the grid, a controller to connect DC portion of the grid-side converter to DC portion of the rotor-side converter to control the rotor-side converter and the grid-side converter, current detection means to detect AC input current of the grid-side converter and means to input the detected current value to the controller. The controller performs current control using the inputted current detection value. The wind power generation system comprises a harmonics elimination converter connected to AC terminal of the grid-side converter, a controller to control the harmonics elimination converter, means to detect AC current on the grid at connection point of the harmonics elimination converter, means to input the detected current value to the controller and means to extract specified-order harmonics from the current detection value inputted to the controller. The harmonics elimination converter outputs current which cancels the extracted specified-order harmonics so that specified-order harmonics contained in AC output current of the grid-side converter are canceled.

Moreover, according to the present invention, the wind power generation system comprises an active filter as means to cancel specified-order harmonics contained in AC output current of the grid-side converter, and the means to extract the harmonics detects AC current on the grid at connection point of the active filter and extracts harmonics component from the detected current value, so that current command value having reversed phase of the harmonics component is calculated to be outputted to the harmonics elimination converter.

Furthermore, according to the present invention, in the wind power generation system, the means to extract the harmonics extracts 5th- or 7th-order harmonics component from the detected current value and calculates the current command value having reversed phase of the harmonics component to be outputted to the harmonics elimination converter.

According to the present invention, distortion by current control can be prevented from being spread or increased and continuity of operation of the grid-side converter can be improved.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention are described with reference to the accompanying drawings.

First Embodiment

Figure 4:
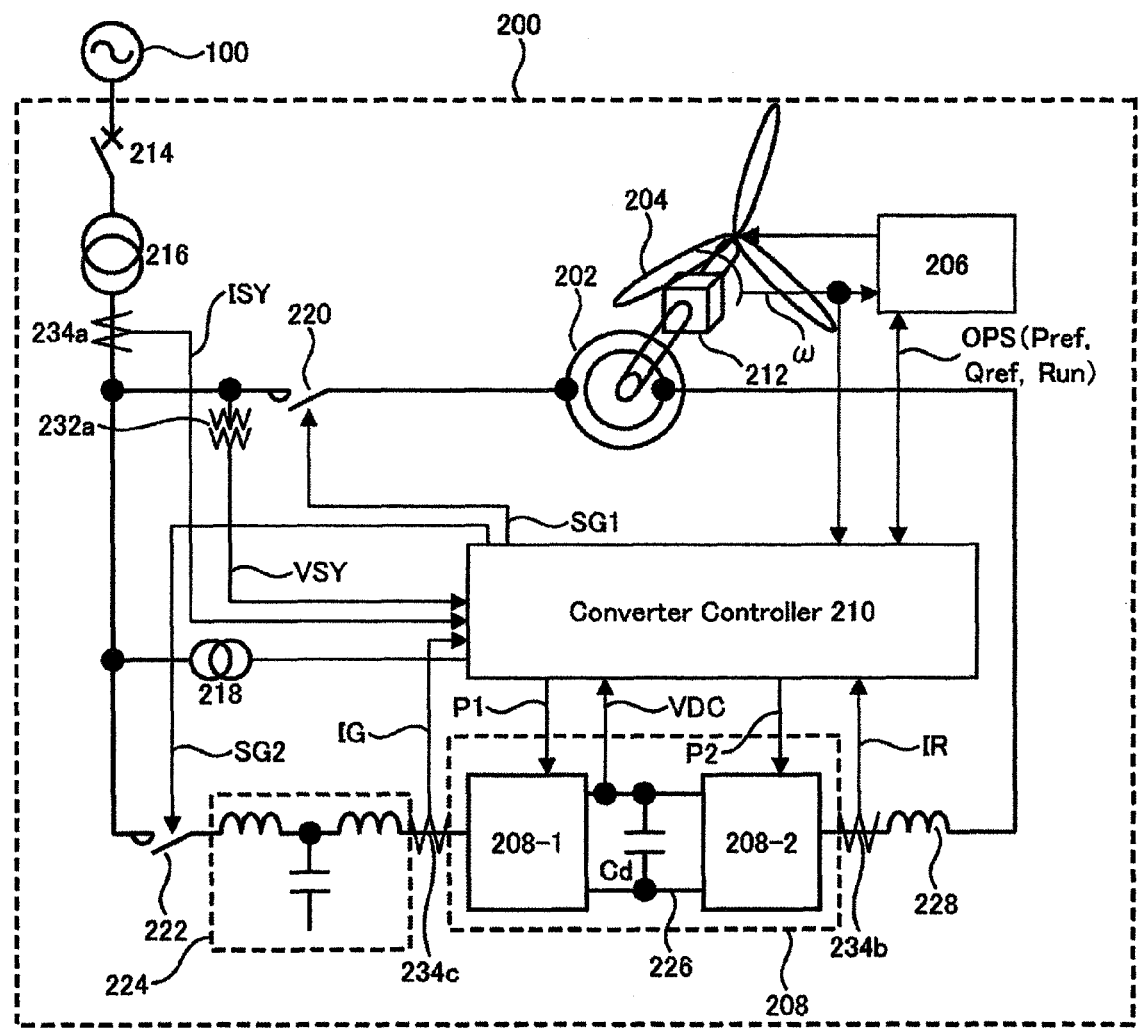
FIG. 4 is a circuit diagram illustrating circuit configuration of a wind power generation system.

Referring now to FIG. 4, apparatus configuration of an embodiment of the present invention is described. FIG. 4 illustrates a multiphase alternating current circuit in a single line diagram.

A wind power generation system 200 is connected to a grid 100 through transmission line. The wind power generation system 200 mainly includes a power generator 202, propellers 204, a windmill controller 206, a converter (exciter) 208 and a converter controller 210.

The propellers 204 are mechanically connected to a rotor of the generator 202 through a gear 212. A rotor winding of the generator 202 is electrically connected to the converter 208.

The windmill controller 206 calculates operation command signals OPS for wind velocity detection, angle control of propellers 204, preparation of power generation command value Pref, output of command value RUN for start/stop and preparation of reactive power command Qref.

The various operation signals OPS such as reactive power command value Qref, power generation command value Pref, start/stop command value Run and propeller angle command value prepared by the windmill controller 206 are transmitted to the converter controller 210 and a propeller angle change unit.

The converter controller 210 adjusts or regulates voltage outputted by the converter 208 so that the voltage complies with command value and controls electric power (generated power and reactive power) between the generator 202 and the power system 100.

Electric power of the converter controller 210 is supplied through a transformer 218.

The converter (exciter) 208 and the converter controller 210 are now described briefly. Three-phase output of the generator 202 on the side of stator is connected to the grid 100 through a circuit breaker 220, for example, which performs make/break operation by external signal SG1, a coupling transformer 216 and a circuit breaker 214. Further, the coupling transformer 216 is connected through a circuit breaker 222 and a filter circuit 224 to a grid-side converter 208-1.

ADC circuit 226 of the converter 208-1 is also connected to a DC circuit of a converter 208-2 and AC output of the converter 208-2 is connected to the rotor winding of the generator 208 through a dV/dt suppression reactor 228.

The circuit breaker 214 is used to cut off current by opening the circuit breaker 214 when excessive current flows continuously in order to protect the system 200, for example, and stop the system 200 perfectly to electrically disconnect it from the power system 100.

The generator-side converter 208-2 and the grid-side converter 208-1 are formed of, for example, semiconductor switching elements (such as thyristors, GTO's, IGBT's, MOS's and SiC's) and function to convert AC to DC or vice versa.

Connected to the AC output terminal of the grid-side converter 208-1 is the AC filter circuit 224 composed of reactors and capacitor and adapted to attenuate harmonics current and voltage.

The rotary portion of the generator 202 is connected through the gear 212 to the propellers 204 for wind power generation and is rotated by wind power. The rotary portion is connected to a position detector such as, for example, encoder for detecting a rotational position and producing a rotational number signal ω. The detected rotational number signal ω is supplied to the windmill controller 26 and the converter controller 210.

Wiring and apparatus for controlling generation power are now described. Three-phase voltage and current on the secondary side of the coupling transformer 216 are converted into a low-voltage voltage detection signal VSY and a low-voltage current detection signal ISY by a voltage sensor 232a and a current sensor 234a, respectively, to be supplied to the converter controller 210. The converter controller 210 calculates electric power produced by the system on the basis of the voltage detection signal VSY and the current detection signal ISY and controls the converter 208 so that the electric power is equal to the command values Pref and Qref.

Voltage of a capacitor Cd connected to the DC circuit 226 of the converters 208-1 and 208-2 is converted into a low-voltage DC voltage signal VDC by voltage sensor and the DC voltage signal VDC is supplied to the converter controller 210.

Output current IR of the converter 208-2 is detected by current sensor 234b and input current IG of the converter 208-1 is detected by current sensor 234c. The detected current values IR and IG are supplied to the converter controller 210.

Further, the converter controller 210 controls electromagnetic contactors 220 and 222 by signals SG1 and SG2 to produce pulse signals P1 and P2 for controlling the converters 208-1 and 208-2, which are structured by semiconductor switching elements, respectively.

The generator-side converter 208-2 of the controller 210 includes a current control system for controlling rotor current IR and the converter 208-2 is driven by the pulse signal P2 to control the current IR.

Figure 1:
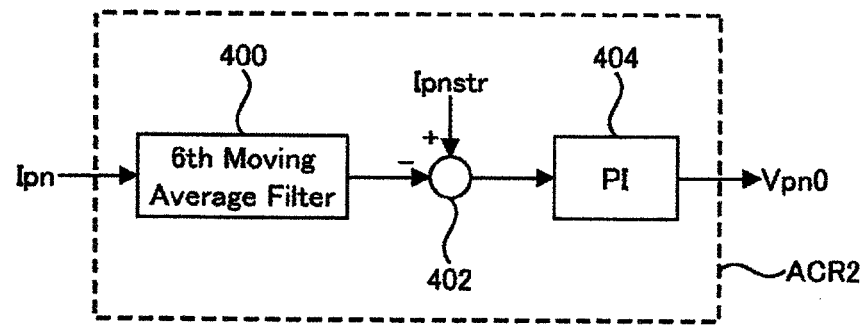
FIG. 1 is a schematic diagram illustrating automatic current regulators ACR1 and ACR2 of a grid-side converter 208-1.
Figure 2:
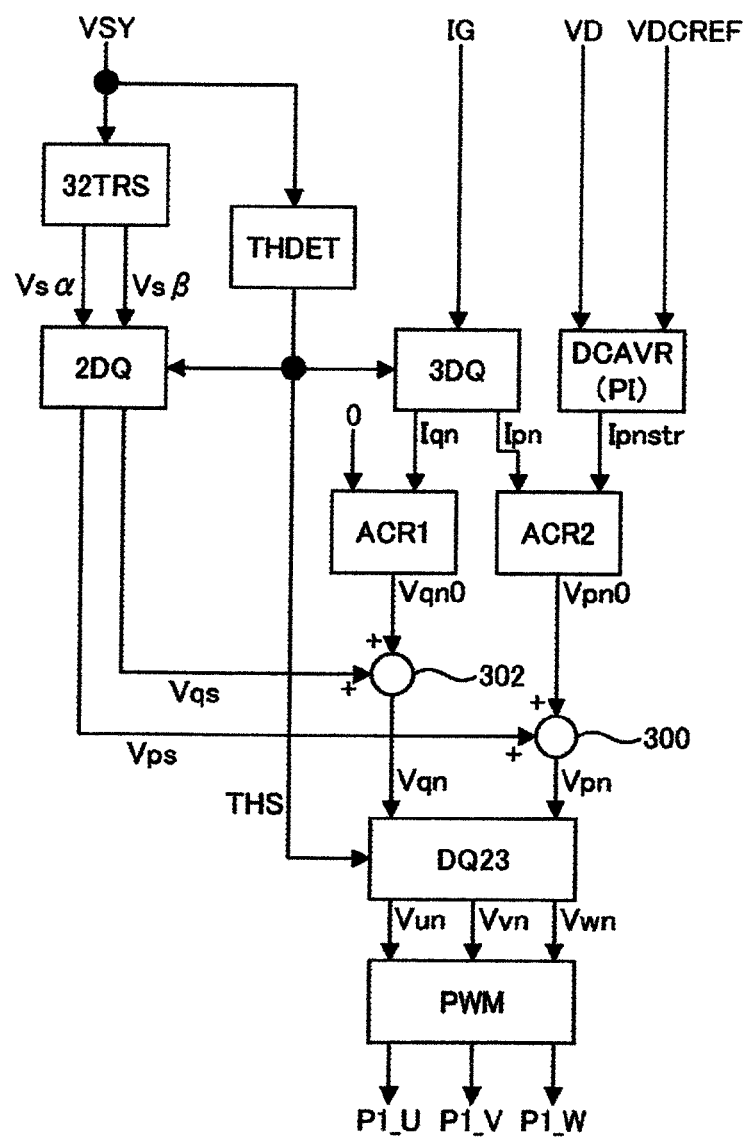
FIG. 2 is a schematic diagram illustrating control configuration of the grid-side converter 208-1.
Figure 3:
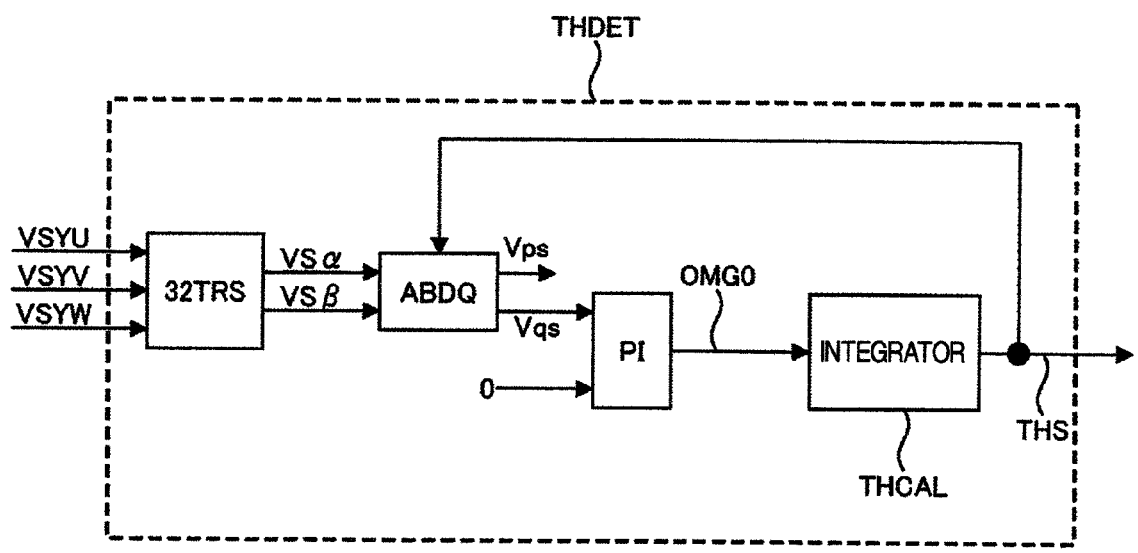
FIG. 3 is a schematic diagram illustrating a phase detector THDET.

Referring now to FIGS. 1 to 3, control function of the grid-side converter 208-1 of the controller 210 is described.

FIG. 2 illustrates control configuration of the converter 208-1. The converter 208-1 has the function of controlling the DC voltage VDC of the smoothing capacitor Cd to be fixed or constant. Accordingly, the converter 208-1 detects phase of system voltage VSY and divides the current into active component and reactive component to perform vector control using the detected voltage phase, so that the converter exchanges active power with the grid to control DC voltage.

When the generator excitation converter 208-2 uses DC power and consumes energy of the smoothing capacitor Cd to lower the DC voltage VDC, DC voltage control DCAVR of the grid-side converter 208-1 adjusts active current Ipn (active power component) to charge the smoothing capacitor Cd so that the DC voltage VDC is maintained to be fixed or constant. Conversely, when the power converter 208-2 charges DC power to raise the DC voltage VDC, DC voltage control DCAVR of the power converter 208-1 converts DC power into AC power to be discharged to the grid and accordingly active current Ipn (active power component) is adjusted to maintain the DC voltage to be fixed or constant.

Before the converter 208-1 starts operation, a circuit for initial charge (not shown) of DC voltage charges the DC voltage VDC and thereafter a turning-on command SG2 of the electromagnetic contactor 222 is outputted, so that the converter 208-1 is connected to the system.

The AC voltage detection value VSY is supplied to a phase detector THDET and a three-phase/two-phase converter 32TRS. The phase detector THDET calculates a phase signal THS (THS: phase signal at the time that system U-phase voltage is a sine wave), which follows or tracks the system voltage, and supplies the phase signal THD to three-phase DQ coordinate converters 3DQ and 2DQ and two-phase/three-phase rotating coordinate converter DQ23. DC voltage command value VDCREF and DC voltage detection value VD are supplied to DC voltage regulator DCAVR (constructed by proportional-plus-integral controller PI, for example). The DC voltage regulator DCAVR adjusts or regulates p-axis current command value (active current command value) Ipnstr outputted thereby so that deviation of the command value VDCREF and the detection value VD supplied thereto is equal to zero and supplies it to current regulator or automatic current regulator ACR2.

The three-phase DQ coordinate converter 3DQ calculates p-axis current detection value Ipn (active current) and q-axis current detection value Iqn (reactive current) from the inputted current IG using three-phase/two-phase conversion expression shown by Expression 1 and rotation coordinate conversion expression shown by Expression 2 and supplies the p-axis current detection value Ipn to current regulator ACR2 and the q-axis current detection value Iqn to current regulator or automatic current regulator ACR1. In FIG. 2, current IG is shown in a single line diagram, although the current IG actually contains three-phase AC components IGU, IGV and IGW. The VSY is also three-phase signal similarly.

Affixed letters U, V and W represent phases of three-phase currents and, for example, U-phase current of current IG is expressed by IGU. Voltage and the like are also represented similarly (U-phase voltage of system voltage VSY is expressed by VSYU).

$$\begin{pmatrix} In\alpha \\ In\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} IGU \\ IGV \\ IGW \end{pmatrix} \quad \text{(Expression 1)}$$

$$\begin{pmatrix} Ipn \\ Iqn \end{pmatrix} = \begin{pmatrix} \cos(THS) & \sin(THS) \\ -\sin(THS) & \cos(THS) \end{pmatrix} \begin{pmatrix} In\alpha \\ In\beta \end{pmatrix} \quad \text{(Expression 2)}$$

The current regulator ACR2 adjusts or regulates p-axis voltage command value Vpn0 outputted thereby so that deviation of the p-axis current command value Ipnstr and the p-axis current detection value Ipn is equal to zero and supplies it to adder 300. Similarly, the current regulator ACR1 adjusts or regulates q-axis voltage command value Vqn0 outputted thereby so that deviation of the q-axis current command value (=0) and the q-axis current detection value Iqn is equal to zero and supplies it to adder 302. The current regulators (ACR1 and ACR2) may be structured by proportional-plus-integral (PI) controller, for example.

The three-phase/two-phase converter 32TRS calculates α component Vsα and β component Vsβ from the inputted voltage VSY using the conversion expression shown by Expression 3 and further calculates p-axis voltage detection value (phase component coincident with system voltage vector) Vps and q-axis voltage detection value (component orthogonal to the p-axis voltage detection value Vps) Vqs using Expression 4 to be supplied to the adders 300 and 302, respectively.

$$\begin{pmatrix} Vs\alpha \\ Vs\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} VSYU \\ YSYV \\ VSYW \end{pmatrix} \quad \text{(Expression 3)}$$

$$\begin{pmatrix} Vps \\ Vqs \end{pmatrix} = \begin{pmatrix} \cos(THS) & \sin(THS) \\ -\sin(THS) & \cos(THS) \end{pmatrix} \begin{pmatrix} Vs\alpha \\ Vs\beta \end{pmatrix} \quad \text{(Expression 4)}$$

The adder 302 adds the p-axis voltage command value Vpn0 and the p-axis Voltage detection value Vps to be supplied to the two-phase/three-phase coordinate converter DQ23. Similarly, the adder 302 adds the q-axis voltage command value Vqn0 and the q-axis voltage detection value Vqs to be supplied to the two-phase/three-phase coordinate converter DQ23.

The two-phase/three-phase coordinate converter DQ23 is supplied with the phase signal THS and the results Vpn and Vqn of the adders and calculates voltage command values Vun, Vvn and Vwn by conversion expressions shown by Expressions 5 and 6 to be supplied to pulse operation unit PWM. The pulse operation unit PWM level-compares the voltage command values Vun, Vvn and Vwn with triangular wave to produce pulses P1_U, P1_V and P1_W to control the grid-side converter 208-1.

$$\begin{pmatrix} Va \\ Vb \end{pmatrix} = \begin{pmatrix} \cos(THS) & \sin(THS) \\ -\sin(THS) & \cos(THS) \end{pmatrix} \begin{pmatrix} Vpn \\ Vqn \end{pmatrix} \quad \text{(Expression 5)}$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad \text{(Expression 6)}$$

Referring now to FIG. 3, the phase detector THDET is described. The phase detector THDET is supplied with system voltages VSYU, VSYV and VSYW of respective phases and performs calculation shown by Expression 3 in three-phase/two-phase conversion 32TRS to be converted into two-phase voltage signals Vsα and Vsβ. Rotation coordinate converter ABDQ is supplied with the two-phase signals Vsα and Vsβ and calculates Vps and Vqs using the coordinate conversion expression shown by Expression 4. The fact that Vqs is equal to zero if the calculated phase THS is coincident with U phase of the system voltage is utilized to correct the phase so that Vqs is equal to zero. Accordingly, Vqs is compared with zero to prepare frequency correction command OMG0. The frequency correction value OMG0 is supplied to an integrator to be integrated by integrator THCAL, so that frequency signal OMG0 is converted into phase signal THS.

Referring now to FIG. 1, the current regulator ACR2 is described. The current regulator ACR2 includes a 6th-order moving average filter 400, a subtracter 402 and a proportional-plus-integral (PI) controller 404. The current regulator ACR2 supplies the p-axis current detection value (effective current) Ipn obtained by supplying the input current IG of the converter 208-1 to the 3-phase DQ coordinate converter 3DQ to the 6th-order moving average filter 400. The output current IG of the converter 208-1 contains low-order harmonics component caused by distortion (5th- and 7th-order) of stator voltage of the generator 202, although 5th-order distortion is the reversed phase whereas 7th-order distortion is the positive phase and when the 5th- and 7th-order distortions are converted with DQ-axis coordinates, both of them are converted into 6th-order component. Accordingly, 6th-order harmonics component is superposed on the p-axis current detection value Ipn. By supplying the p-axis current detection value Ipn to the 6th-order moving average filter 400, 6th-order harmonics component is removed from output of the 6th-order moving average filter. That is, the current regulator does not respond to harmonics components (5th- and 7th-order) of the output current IG of the converter 208-1 caused by distortion of stator voltage of the generator 202 and accordingly it is realized that the grid-side converter 208-1 is prevented from spreading current distortion.

The foregoing current control operation is the same even for the current regulator ACR1 and the q-axis current detection value (reactive current) obtained by supplying the input current IG of the converter 208-1 to three-phase DQ coordinate converter 3DQ01 is supplied to the 6th-order moving average filter 400, so that current distortion by current control can be prevented from being spread.

Second Embodiment

Figure 5:
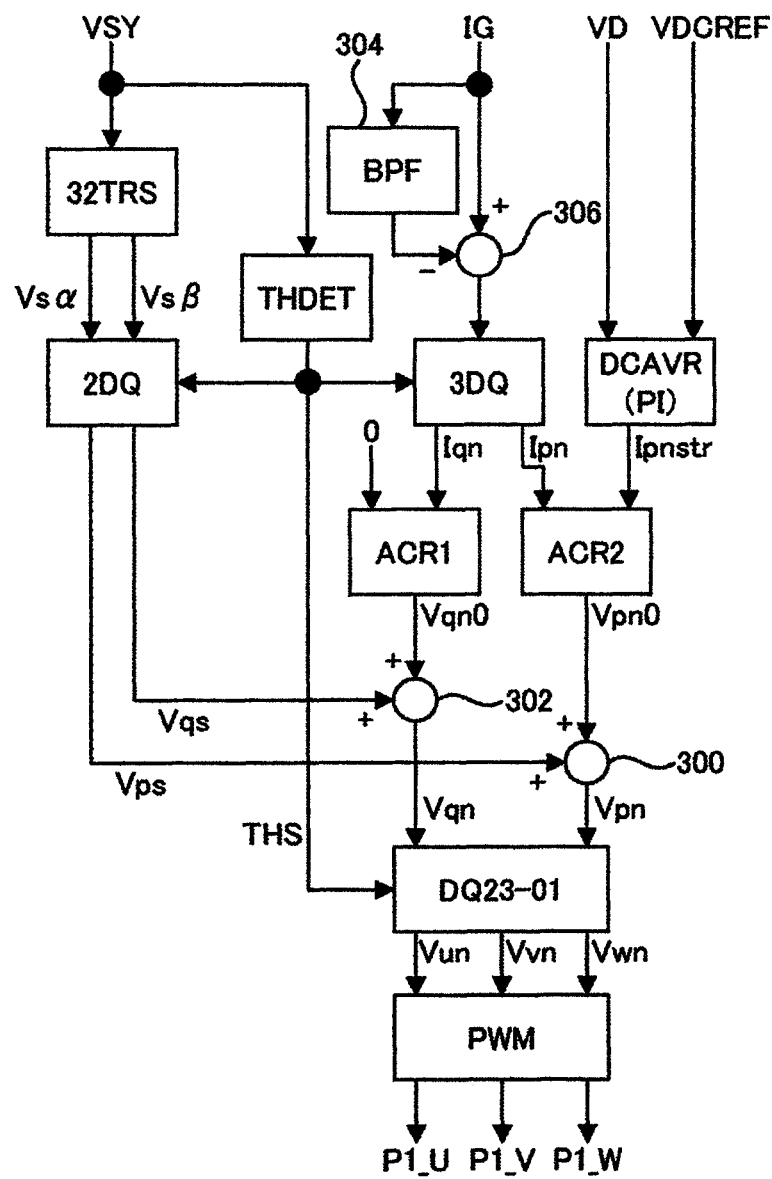
FIG. 5 is a schematic diagram illustrating control configuration of the grid-side converter 208-1.

The second embodiment is now described with reference to FIG. 5. The second embodiment is different from the embodiment 1 in that the filter is not inserted in DC component of the current detection value but is inserted in AC component.

In the embodiment, the output current IG of the converter 208-1 is supplied to BPF (band-pass filter) 304 and subtracter 306. By designing the band-pass filter 304 so that the band-pass filter 304 extracts only 5th- and 7th-order components contained in the input current IG of the converter 208-1, the 5th- and 7th-order components are not inputted to current control of the grid-side converter 208-1 and accordingly the current distortion by control of the converter 208-1 can be prevented from being spread.

Third Embodiment

Figure 6:
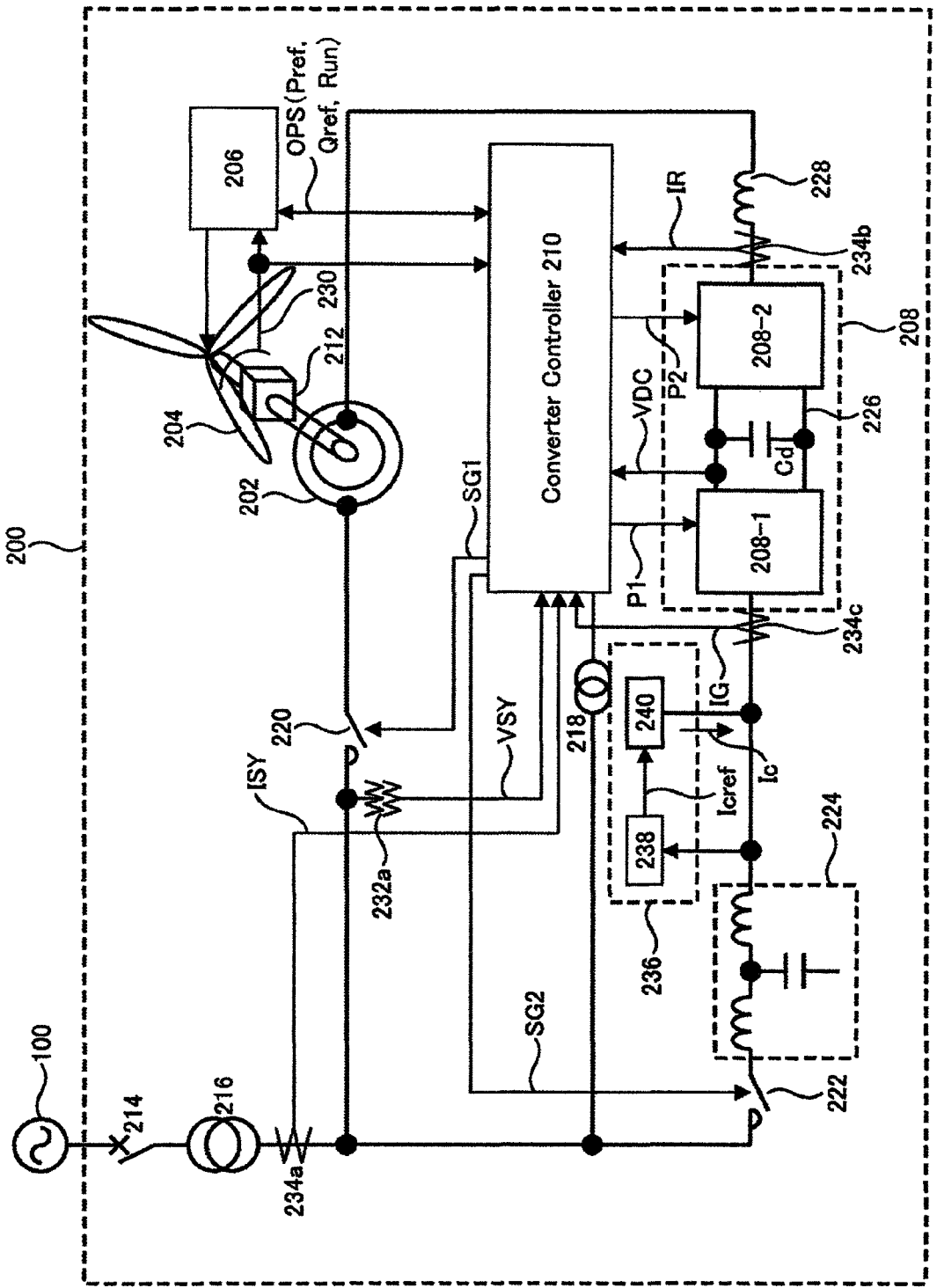
FIG. 6 is a circuit diagram illustrating circuit configuration of a wind power generation system.

The third embodiment is now described with reference to FIG. 6. In the embodiments 1 and 2, the filter for eliminating specified frequency is inserted in the controller 210 of the converter 208-1, so that the current distortion by current control can be prevented from being spread or increased, although as shown in FIG. 6, an active filter 236 for canceling low-order harmonics components (5th- and 7th-order) generated in the input current IG of the converter 208-1 due to distortion of stator voltage of the generator 202 is provided in AC input terminal of the converter 208-1, so that the current distortion by current control can be prevented from being spread.

The active filter 236 includes a harmonics detection circuit 238 and a converter 240. The harmonics detection circuit 238 detects AC current on the grid at connection point of the active filter 236 to extract harmonics components (5th- and 7th-order) from the detected current and calculates current command value Icref having reversed phase of the harmonics components to be supplied to the converter 240. The converter 240 produces current Ic in accordance with the current command value Icref Thus, the harmonics components (5th- and 7th-order) contained in the input current IG of the grid-side converter 208-1 can be canceled, so that current distortion by current control of the grid-side converter 208-1 can be prevented from being spread. In the embodiment, the harmonics detection circuit 238 detects AC current on the grid at connection point of the active filter 236, although stator current of the generator 202 may be detected on the grid side from the filter circuit 224.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind power generation system including a doubly-fed induction generator having a stator connected to a grid, a rotor-side converter connected to a rotor of the doubly-fed induction generator, a turbine connected to the rotor of the doubly-fed induction generator, a grid-side converter connected to the stator of the doubly-fed induction generator and the grid, a controller to connect DC portion of the grid-side converter to DC portion of the rotor-side converter to control the rotor-side converter and the grid-side converter, current detection means for detecting AC input current of the grid-side converter and means for inputting the detected current value to the controller, the controller performing current control using the inputted current detection value, wherein
the controller comprises:
means for eliminating harmonics component of specified-order from the inputted current detection value of the grid-side converter;
means for controlling the grid-side converter using the current detection value in which harmonics are eliminated; and
wherein the specified-order is 6nth-order (n being an integer equal to or greater than 1; wherein by supplying p-axis current detection value Ipn to the 6th-order moving average filter, 6th-order harmonics component is removed from output of the 6th-order moving average filter.

2. A wind power generation system according to claim 1, comprising
means for converting the inputted current detection value of the grid-side converter into DC component by rotation coordinate conversion,
means for supplying the converted DC component of the inputted current detection value of the grid-side converter to a filter in the controller to eliminate specified-order harmonics contained in output current detection value of the grid-side converter, and
control means for controlling the grid-side converter using the current detection value in which specified-order harmonics are eliminated.

3. A wind power generation system according to claim 1, comprising
means for supplying output current detection value of the grid-side converter to a filter to eliminate specified-order harmonics contained in output current detection value of the grid-side converter, and
control means for controlling the grid-side converter using the current detection value in which specified-order harmonics are eliminated.

4. A wind power generation system according to claim 1, wherein the elimination of harmonics component is executed by a moving average filter.

5. A wind power generation system according to claim 1, wherein the inputted current converted by rotation coordinate conversion is processed by a moving average filter.

6. A wind power generation system according to claim 1, wherein
converting the inputted current into DC component by rotation coordinate conversion;
eliminating reversed phase harmonics component of (6n−1)th-order and positive phase harmonics component of (6n+1)th-order by processing the converted DC component of inputted current by a 6 nth-order n being an integer equal to or greater than 1 moving average filter; and using the DC component of the inputted current, reversed phase harmonics component of (6n−1)th-order and positive phase harmonics component of (6n+1)th-order are eliminated therefrom, to control the grid-side converter.

7. A wind power generation system including a doubly-fed induction generator having a stator connected to a grid, a rotor-side converter connected to a rotor of the doubly-fed induction generator, a turbine connected to the rotor of the doubly-fed induction generator, a grid-side converter connected to the stator of the doubly-fed induction generator and the grid, a controller to connect DC portion of the grid-side converter to DC portion of the rotor-side converter to control the rotor-side converter and the grid-side converter, current detection means for detecting AC input current of the grid-side converter and means for inputting the detected current value to the controller, the controller performing current control using the inputted current detection value, comprising:

a harmonics elimination converter connected to AC terminal of the grid-side converter, a controller to control the harmonics elimination converter, means for detecting AC current on the grid at connection point of the harmonics elimination converter, means for inputting the detected current value to the controller and means for extracting specified-order harmonics from the current detection value inputted to the controller, the harmonics elimination converter outputting current which cancels the extracted specified-order harmonics so that specified-order harmonics contained in AC output current of the grid-side converter are canceled, and wherein the specified-order is 6th-order (n being an integer equal to or greater than 1; by supplying p-axis current detection value Ipn to the 6th-order moving average filter, 6th-order harmonics component is removed from output of the 6th-order moving average filter.

8. A wind power generation system according to claim 7, comprising an active filter as means for canceling specified-order harmonics contained in AC output current of the grid-side converter, and wherein the means for extracting the harmonics detects AC current on the grid at connection point of the active filter and extracts harmonics component from the detected current value, so that current command value having reversed phase of the harmonics component is calculated to be outputted to the harmonics elimination converter.

9. A wind power generation system according to claim 8, wherein the means for extracting the harmonics extracts 5th- or 7th-order harmonics component from the detected current value and calculates the current command value having reversed phase of the harmonics component to be outputted to the harmonics elimination converter.

10. A wind power generation system according to claim 7, wherein the elimination of harmonics component is executed by a moving average filter.

11. A wind power generation system according to claim 7, wherein converting the inputted current into DC component by rotation coordinate conversion;

eliminating reversed phase harmonics component of (6n−1)th-order and positive phase harmonics component of (6n+1)th-order by processing the converted DC component of inputted current by a 6 nth-order n being an integer equal to or greater than 1 moving average filter; and using the DC component of the inputted current, reversed phase harmonics component of (6$n$−1)th-order and positive phase harmonics component of (6n+1)th-order are eliminated therefrom, to control the grid-side converter.

* * * * *